US010379260B2

(12) United States Patent
Platzer

(10) Patent No.: US 10,379,260 B2
(45) Date of Patent: *Aug. 13, 2019

(54) SYSTEM AND METHOD FOR HIGH-RESOLUTION RADIO OCCULTATION MEASUREMENT THROUGH THE ATMOSPHERE

(71) Applicant: Spire Global Inc., San Francisco, CA (US)

(72) Inventor: Peter Platzer, San Francisco, CA (US)

(73) Assignee: Spire Global, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,037

(22) Filed: May 14, 2018

(65) Prior Publication Data

US 2018/0364393 A1  Dec. 20, 2018

Related U.S. Application Data

(63) Continuation of application No. 13/961,384, filed on Aug. 7, 2013, now Pat. No. 9,971,062, which is a continuation-in-part of application No. 13/757,062, filed on Feb. 1, 2013, now Pat. No. 9,519,873.

(51) Int. Cl.
*G01W 1/10* (2006.01)
*G01S 13/95* (2006.01)
*H04B 7/185* (2006.01)
*G06Q 10/02* (2012.01)

(52) U.S. Cl.
CPC ............ *G01W 1/10* (2013.01); *G01S 13/955* (2013.01); *G06Q 10/02* (2013.01); *H04B 7/18513* (2013.01)

(58) Field of Classification Search
CPC .... H04B 7/18513; G01S 13/955; G01W 1/10; G06Q 10/02
USPC ......................................................... 702/2, 3
See application file for complete search history.

(56) References Cited

U.S. PATENT DOCUMENTS

| | | | |
|---|---|---|---|
| 5,410,728 A | 4/1995 | Bertiger et al. | |
| 5,604,920 A | 2/1997 | Bertiger et al. | |
| 5,940,739 A | 8/1999 | Conrad et al. | |
| 5,963,166 A | 10/1999 | Kamel | |
| 6,067,453 A | 5/2000 | Adiwoso et al. | |
| 6,253,080 B1* | 6/2001 | Wiedeman | H04B 7/18558 370/316 |
| 6,271,877 B1 | 8/2001 | LeCompte | |
| 6,381,228 B1 | 4/2002 | Prieto, Jr. et al. | |

(Continued)

FOREIGN PATENT DOCUMENTS

EP  1037405 A2  9/2000

OTHER PUBLICATIONS

Carson-Jackson ("Satellite AIS-Developing Technology or Existing Capability?", The Journal of Navigation (2012), 65, 303-321).

*Primary Examiner* — An H Do
(74) *Attorney, Agent, or Firm* — Troutman Sanders LLP

(57) ABSTRACT

A constellation of individual satellites are employed to concurrently collect occultation data from multiple GPSS originating signals that pass through atmospheric sections of interest. By coordinating the collection and processing of the data using state of the art receivers on a constellation of low earth orbit satellites and networked processing, highly accurate calculation of atmospheric conditions and related future weather events are possible.

16 Claims, 7 Drawing Sheets

(56) References Cited

U.S. PATENT DOCUMENTS

| | | | |
|---|---|---|---|
| 6,584,452 B1 | 6/2003 | Prieto, Jr. et al. | |
| 8,170,474 B2* | 5/2012 | Karabinis | H04B 7/026 455/12.1 |
| 8,411,969 B1 | 4/2013 | Joslin et al. | |
| 9,363,712 B2* | 6/2016 | Chuberre | H04B 7/18578 |
| 9,971,062 B2* | 5/2018 | Platzer | G01W 1/10 |
| 2003/0217362 A1 | 11/2003 | Summers et al. | |
| 2004/0263386 A1 | 12/2004 | King et al. | |
| 2007/0182628 A1 | 8/2007 | Pomerantz et al. | |
| 2007/0208513 A1 | 9/2007 | Hillman | |
| 2008/0071633 A1 | 3/2008 | Ozkan et al. | |
| 2009/0007240 A1 | 1/2009 | Vantalon et al. | |
| 2011/0304502 A1 | 12/2011 | Chen et al. | |
| 2012/0018585 A1 | 1/2012 | Liu et al. | |
| 2012/0092213 A1 | 4/2012 | Chen | |
| 2013/0018529 A1 | 1/2013 | Ploschnitznig | |

* cited by examiner

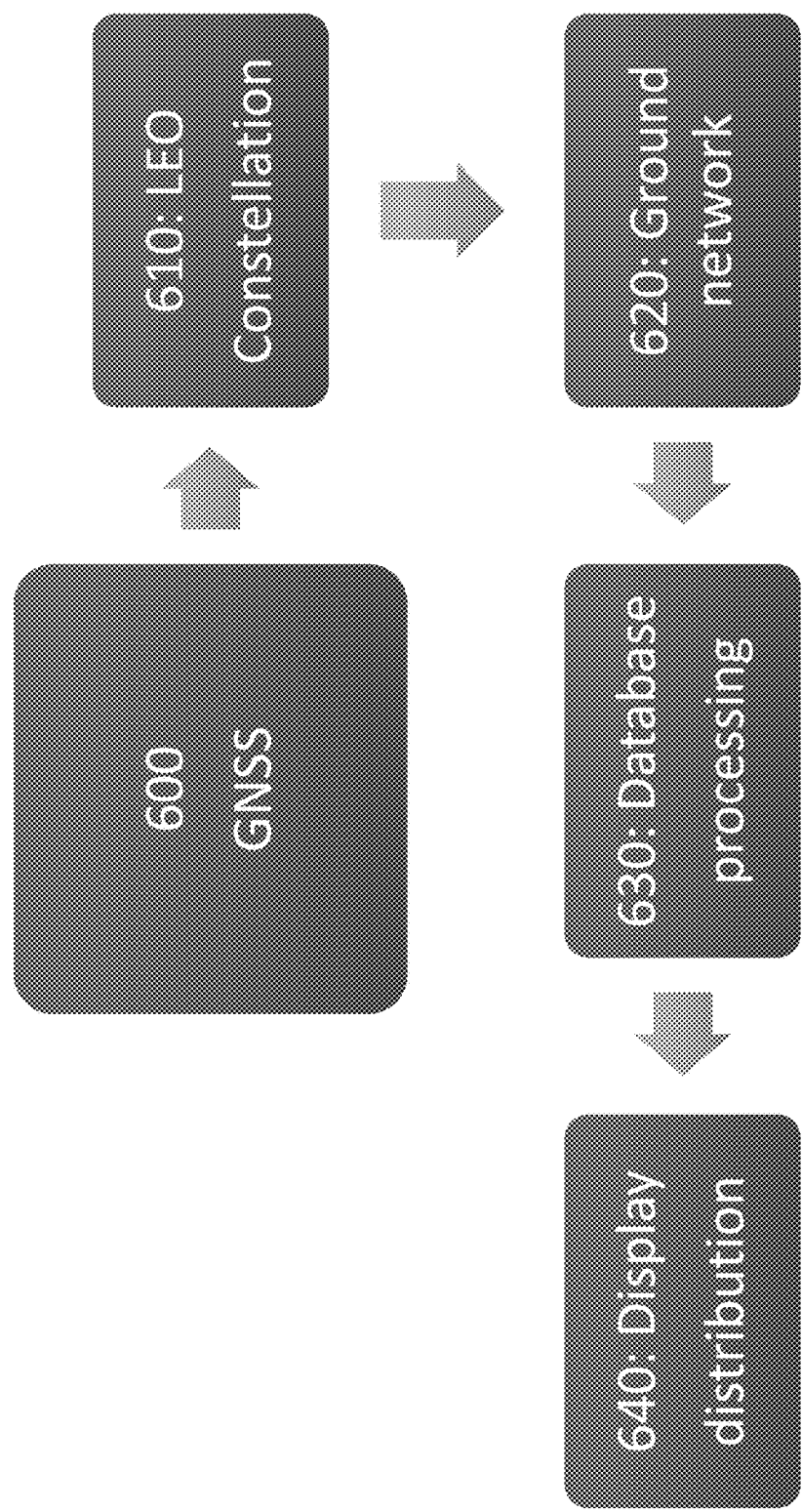

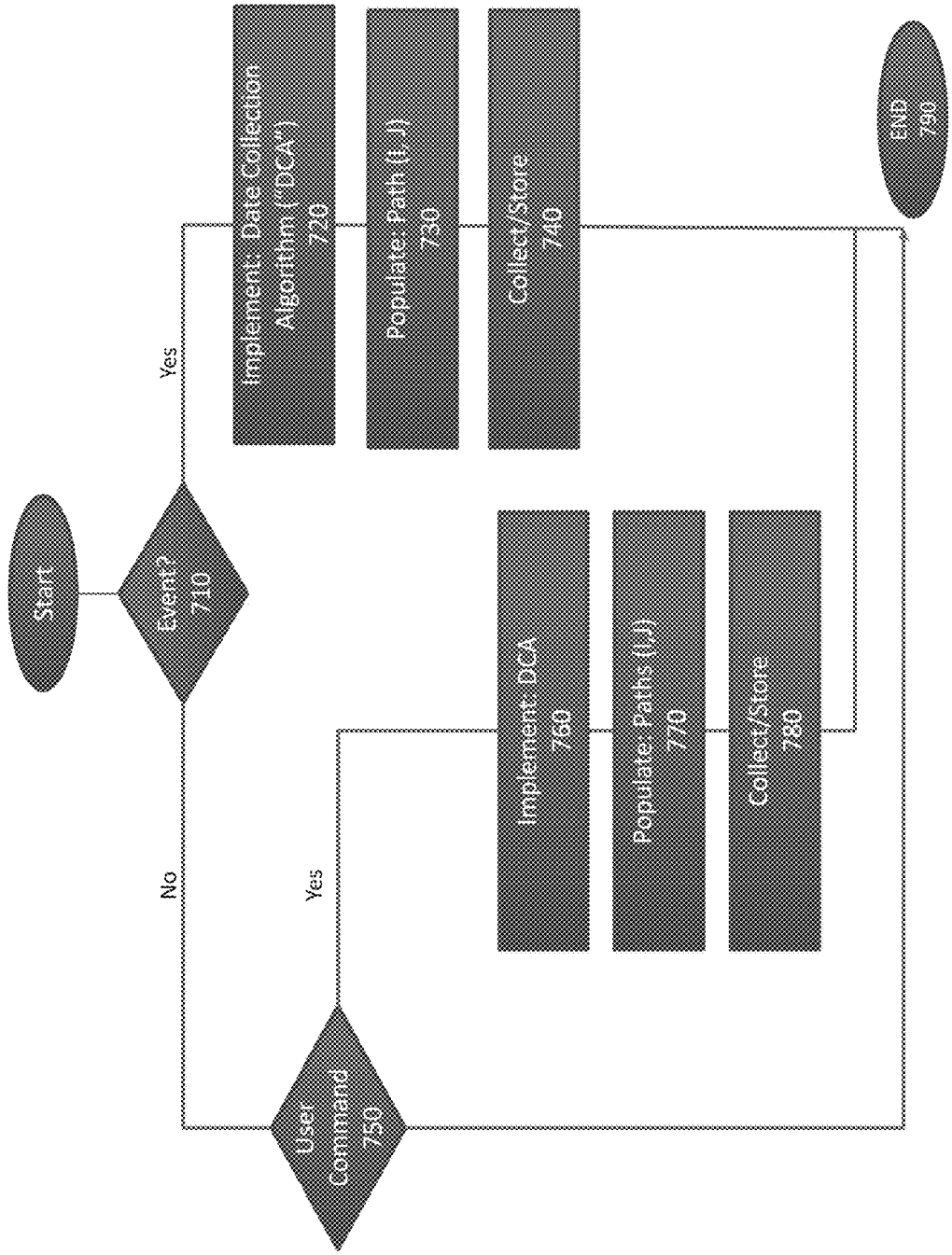

SYSTEM AND METHOD FOR HIGH-RESOLUTION RADIO OCCULTATION MEASUREMENT THROUGH THE ATMOSPHERE

CROSS REFERENCE TO RELATED PATENT APPLICATIONS

The present application is a continuation of U.S. patent application Ser. No. 13/961,384 ("'384 application") by Peter Platzer, the inventor here, entitled, "SYSTEM AND METHOD FOR HIGH-RESOLUTION RADIO OCCULTATION MEASUREMENT THROUGH THE ATMOSPHERE" and filed on Aug. 7, 2013, which is a continuation-in-part application of U.S. patent application Ser. No. 13/757,062 ("'062 application") by Peter Platzer, the inventor here, entitled, "SYSTEM AND METHOD FOR WIDESPREAD LOW COST ORBITAL SATELLITE ACCESS" and filed on Feb. 1, 2013. Another continuation-in-part application by the same inventor is filed concurrently herewith, entitled, "COMPUTERIZED NANO-SATELLITE PLATFORM FOR LARGE OCEAN VESSEL TRACKING." The contents of these applications are incorporated by reference herein.

FIELD OF INVENTION

The present invention relates to the measurement of radio occultation through the atmosphere to determine atmospheric parameters useful in the atmospheric sciences, such as meteorology and climatology. Reliable radio occultation measurements can be made by tracking known satellite radio signals from a Global Navigation Satellite System (GNSS), such as the Global Positioning System (GPS), as the signals pass through and are refracted by the atmosphere.

BACKGROUND

Ranging from vacation planning to survival tactics, few things have as much of an impact on our lives as the weather. Weather and climate matters factor crucially into many major business, economic, government, military, and individual decisions. Notwithstanding this critical role, weather conditions remain stubbornly difficult to predict with accuracy.

Many researchers in addressing climate prediction see the problem in terms of insufficient real time data regarding the huge and complex fluid dynamic systems that our atmosphere represents. Recent advances in computing technology now allow for the processing of vast amounts of data, and this provides for a better understanding of atmospheric conditions. However, there still exist significant weaknesses in the existing systems for capturing atmospheric data—critical data regarding atmospheric conditions that is otherwise critical for implementing the weather models that permit accurate predictions. In other words, we have very capable computer systems that process what data we have, but we need more and better data—indeed data collected very quickly or even in real time—to implement the processing that will give better predictions.

As an electromagnetic wave passes from space through a medium such as a planet's atmosphere, it is refracted and the phase and amplitude are modulated. The degree of this modulation is known as the refractivity of the atmosphere. If the refractivity for a portion of the atmosphere is determined, the atmospheric properties for that portion can be calculated or estimated. These relationships allow for determination of such atmospheric properties such as air pressure, temperature, water vapor pressure, ionosphere frequency and electron density temperature, pressure, air density, and water content.

Radio Occultation (RO) is a technique for determining atmospheric properties by observing how a radio wave behaves as it passes through an atmosphere. A radio receiver is positioned to receive the occulted radio wave and the degree of refraction and modulation are measured. From this, the refractivity is derived and atmospheric properties can be determined. Using this technique, a high degree of precision in the derived properties over a large vertical atmospheric section can be obtained. Furthermore, at longer radio wavelengths, cloud cover has little to no effect on the measurements, which provides tremendous advantage over existing atmospheric observation methods.

Existing weather satellite systems, such as NASA GOES, provide imaging data on cloud tops, but cannot routinely profile an entire atmospheric column. Using RO, atmospheric data along a relatively large vertical resolution can provide key insight into the three dimensional state of the atmosphere, which is crucial to climatology study.

A Global Navigation Satellite System (GNSS), such as GPS, provides excellent radio signal sources for RO study because they are a large network of existing satellites transmitting a reliable signal of a known quality at regular intervals. The precise location of the sources of GNSS signals relative to the Earth—an important part of RO measurements—are also known for any time of the day. Additionally, the large number of satellites provides many sounding opportunities for a single receiver satellite as it orbits, allowing the receiver satellite to take RO measurements across many "slices" of the atmosphere as it orbits and different occulted GNSS signals come within view.

A number of different GNSS systems are suitable for RO study. The United States's Global Positioning System (GPS) is well known and provides global coverage. Russia's Global Navigation Satellite System (GLONASS) also provides global coverage, but has been through periods of unreliability. The European Union's Galileo system is currently in development, but will provide global coverage with 35 satellites once operational. India's Regional Navigational Satellite System (IRNSS) and China's BeiDou Satellite Navigation System (BDS or Compass) are regional systems, but nevertheless provide suitable signals from which RO measurements can be taken.

There are existing missions to study GPS RO, most recently with the joint U.S./Taiwan FORMOSAT-3/COSMIC mission (COSMIC). Launched in 2006, the COSMIC project consists of six approximately 70 kg Low Earth Orbit (LEO) satellites each carrying GPS receivers and ionospheric photometer. GPS RO observations from COSMIC and previous missions have already improved weather predictions at many national forecast centers around the world. However, the COSMIC satellites are approaching the end of their operational lifetimes, while follow-on systems have encountered delays and funding issues, and are insufficient to meet the current and future demands of weather forecasting, climate monitoring and space weather prediction.

This highlights a major disadvantage of past and existing GPS RO systems. While relatively inexpensive when compared to traditional weather satellites, these systems still require institutional or governmental level funding for development, launch and maintenance. The custom, non-standard satellite platforms inevitably lead to a higher cost system that is also expensive to replace. Aging satellites rapidly degrade in the harsh environment of space. The technology aboard these satellites is also limited to the state of the art at the time that they were launched. The hardware of a satellite fleet cannot be upgraded and quickly becomes obsolete.

Higher cost satellite systems rely on fewer satellites. Having fewer receivers in orbit limits the number of global soundings, or RO observations, that are made within a given time period—a severe disadvantage when measuring a highly dynamic weather pattern, such as a hurricane. Fewer satellites also means lower geographic coverage as each satellite can only take RO measurements across a single slice of the atmosphere at one time.

Existing GPS RO satellites communicate directly with ground stations, which requires line of sight between the satellite and ground station. Non-geosynchronous orbiting satellites are within line of sight of a ground station for limited periods of time, which may result in delays in the delivery of a data package. This introduces further decreases in temporal resolution.

SUMMARY

It is an object of this invention to provide a flexible, upgradeable satellite network for taking high-resolution RO measurements through the atmosphere for purposes that include weather prediction.

It is another object of this invention to provide RO measurements of the atmosphere over select regions of the globe through the use of a large constellation of small satellites.

It is another object of this invention to provide RO measurements of the atmosphere over all or at least a large portion of the globe through the use of a large constellation of small satellites. Reliable RO measurements are achievable from approximately 1 km above the surface or lower through the ionosphere.

It is another object of this invention to provide rapid response or near real time RO measurement collection from multiple viewing angles of a selected portion of the atmosphere through the use of a large constellation of small satellites making multiple RO readings from GNSS satellite signals It is another object of this invention to provide a reliable, flexible and efficient space-based data collection network through a large constellation of small satellites capable of communicating with each other and multiple ground stations.

It is another object of this invention to provide a highly reliable and scalable satellite network by utilizing inexpensive, replaceable satellite units that do not require meaningful hardware maintenance after being placed into orbit. Redundancy is built into the system by adding more satellites than minimally required for the mission task.

It is another object of this invention to provide a highly flexible data collection network through the use of a frequently updated fleet of satellites. Frequent hardware revisions can take advantage of performance gains in commonly available components and to respond to evolving mission requirements and further refinements in operating theory.

It is another object of this invention to provide high resolution and error-corrected RO measurements by using multiple RO measurements from multiple GNSS signals across different frequencies.

It is still another object of the present invention to provide a network of multiple low cost satellites in low earth orbit equipped with radio receivers tuned to select GNSS signals and further including additional sensors such as optical detectors, cameras and the like to create discrete readings of RO, image and other atmospheric properties that can be integrated to form a predictive tool regarding atmospheric changes.

The above and other objects of the present invention may be realized in an illustrative non-limiting example thereof comprising a constellation of radio receiver equipped satellites that are programmed to collect RO data from an existing network of GNSS. This constellation includes communication links to one or more earth stations for data downloads and for the receipt of new instructions or changes to programming. In various alternate arrangements and preferred embodiments, the system of multiple satellites includes data transmission between individual satellites for data qualifying parsing, assembling and/or distributed processing. In a preferred arrangement, satellite life is limited so obsolete satellites are quickly replaced with newer version that includes updated hardware and programming. In a preferred arrangement, multiple ground stations are deployed in strategically useful locations to increase direct communication windows for each satellite in the constellation.

In accordance with the varying features of the present invention, the constellation of satellites is preferably at least 10 individual operating vehicles. In a more preferred arrangement, at least 30 to 50 satellites form a working constellation. In the most preferred arrangement, the constellation includes between 75 and 100 satellites in communication with multiple ground stations and with each other. The preferred system includes optical sensors and cameras to create imaging data for integration with RO in processing algorithms.

A better understanding of the present invention can be gained by reviewing the following detailed description of the preferred embodiment, taken in conjunction with the illustrative figures provided:

FIGURES OF DRAWINGS

FIG. 6 depicts a functional block diagram for the data flow; and

FIG. 7 is a flow chart for the system.

DETAILED DESCRIPTION

Satellite Constellation and Ground Station Network

A constellation of satellites as described in U.S. patent application Ser. No. 13/757,062 ("'062 application") are launched into a low earth orbit at an altitude of 200-1000 km. Typically, the satellites in the constellation can each include memory and processors for implementing programming on-board. In a preferred embodiment, the satellite platform incorporates standard designs and utilizes commonly available hardware and open source software to realize further cost savings. This allows for a large number of satellites to be produced and launched.

Each satellite within the constellation in the present invention ("constellation satellite") is equipped with receiver hardware capable of receiving signals from one or more GNSS in current use and now orbiting the planet. As new GNSS are placed into service, use of these new radio signal sources will be incorporated into newly launched satellites or programmed into existing satellites. In a preferred embodiment the receiver hardware is designed for a particular GNSS signal for higher computational efficiency and lower power consumption. In another embodiment, a software GNSS receiver provides the satellite with adaptive signal processing capabilities at the cost of higher processing and power consumption.

For the sake of simplicity, the GPS system and its components and features are specifically referred to hereinafter, but it is understood in the art that signals from any GNSS system (e.g. GLOSNASS) may be used in RO measurements and the present invention may be configured to utilize the signals from any one or more GNSS system.

Figure 1:
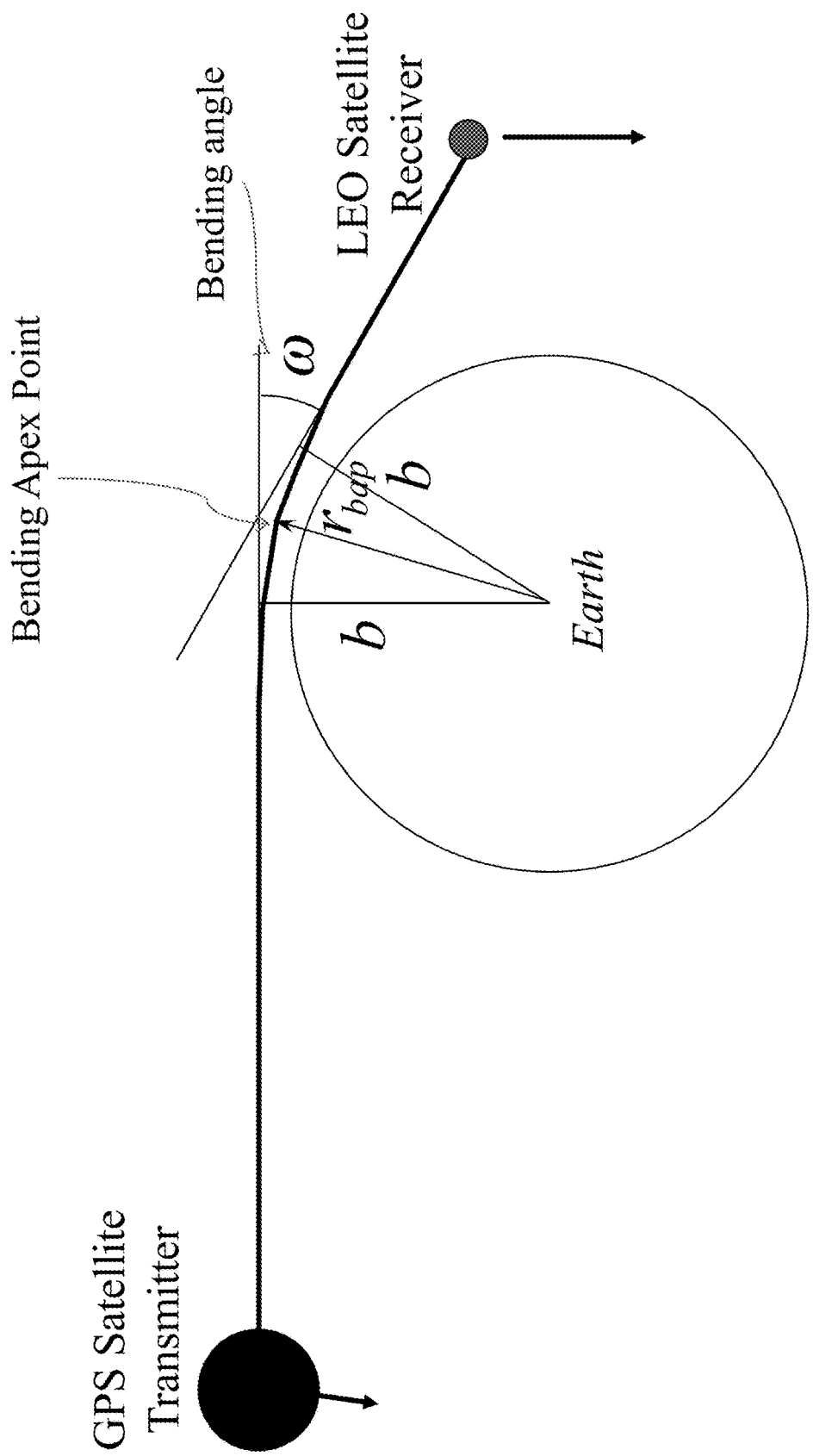
FIG. 1 illustrates the RO signal based on atmospheric conditions.

FIG. 1 depicts the generation of an occultation signal measurable by the constellation satellite. In this arrangement, the GPS transmitter delivers a signal having known properties. A low earth orbit (LEO) satellite includes one or more signal receivers tuned to the transmitted signal—a signal that follows a known path through the atmosphere. The received signal is distorted (occulted) by the atmosphere, and the resulting occultation (RO) can be measured. A single constellation satellite is capable of taking RO measurements. Each additional satellite in the constellation increases temporal resolution and coverage of the system as a whole, and provides more opportunity for RO data generation over select portions of the atmosphere. In addition, as more satellites are added, a constellation is created that supports multiple data points within a single atmospheric region and faster delivery of data for processing by intersatellite communication and the benefits it provides as described below. A preferred embodiment comprises 50-100 satellites to achieve a near real time temporal resolution in select regions of the atmosphere.

Figure 2:
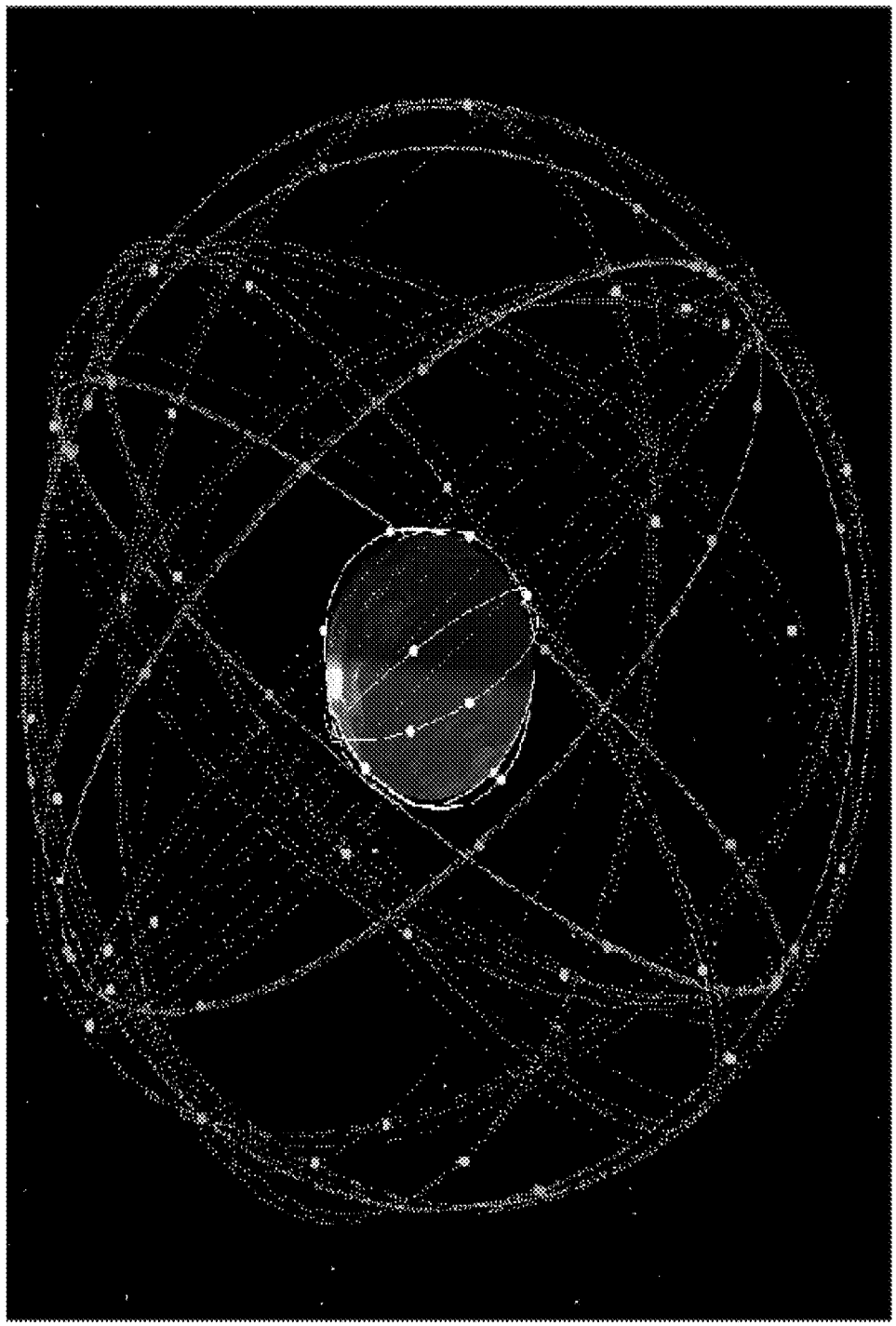
FIG. 2 depicts GNSS and the constellation in orbit around the earth.

FIG. 2 provides a schematic of both the GNSS arrangement in orbit around the earth, and the complementary satellite constellation, placed in low earth orbit for receiving GPS signals from the GNSS to develop RO data.

Figure 3:
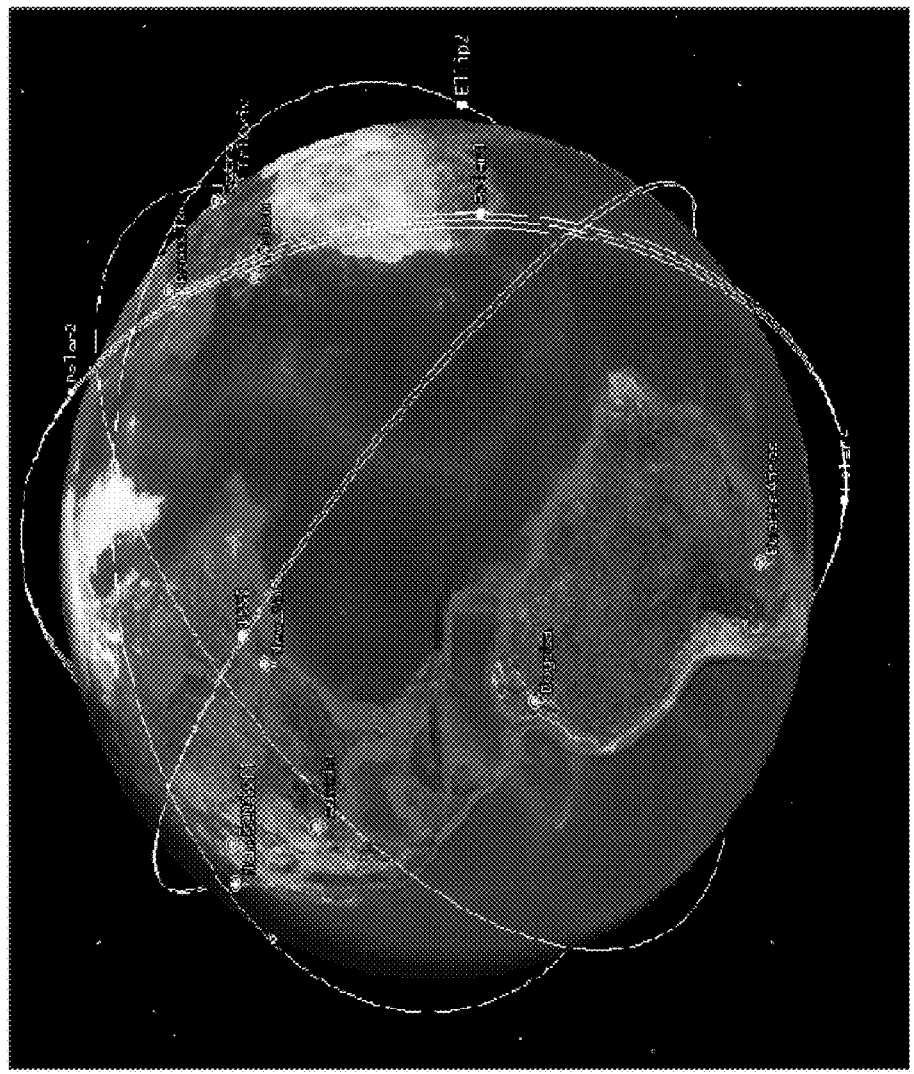
FIG. 3 depicts an illustrative constellation arrangement in orbit.

FIG. 3 depicts multiple orbits of the constellation satellites, and multiple earth based ground stations forming a communication network for collecting RO data. The constellation satellites are capable of attitude control through a combination of magnetorquers and/or reaction wheels. Orientation may be determined through a combination of one or more on-board magnetometer, sun sensors, gyroscopes and/or accelerometers. The constellation satellites are further configured to determine current location and velocity with respect to the Earth through the on-board GNSS receiver.

The constellation satellites may also include one or more on-board digital cameras. The cameras provide additional data on weather systems that is combined with RO measurements. In one embodiment, constellation satellites are equipped with a standard digital camera or smartphone camera system to capture images within the visible spectrum. In another embodiment, constellation satellites are equipped with a multispectral or hyperspectral digital camera system to capture images over a wide range of the electromagnetic spectrum. Wide spectrum images are useful for capturing data past the upper cloud layer. The high replacement rate of the constellation satellite system allows for advances and cost reductions in camera sensors to be exploited.

Figure 4:
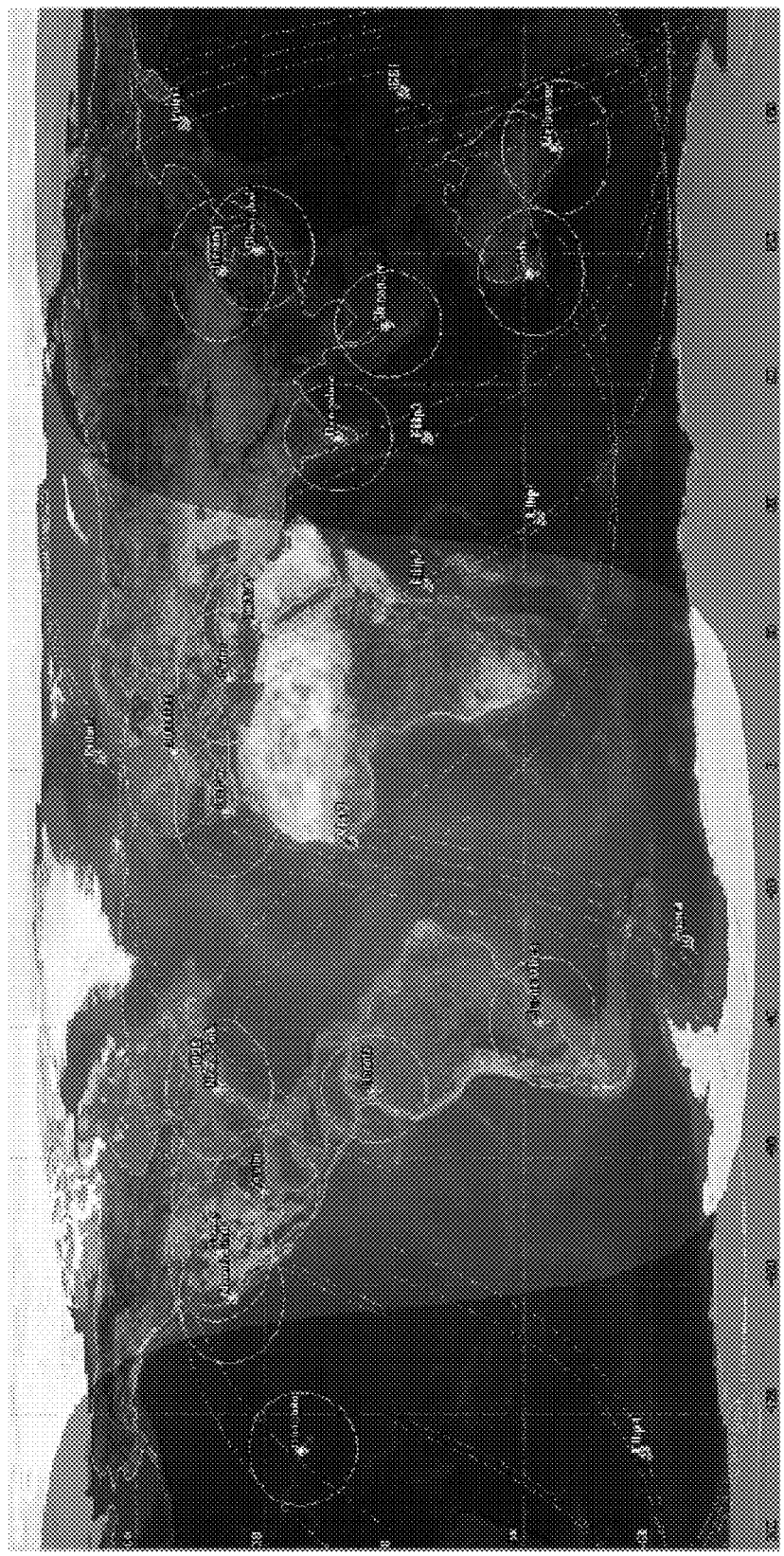
FIG. 4 depicts global placement of an illustrative network of ground stations.

FIG. 4 provides a regional diagram for multiple ground stations and possible communication coverage for RO data collection. The constellation satellites are configured to transmit data and communicate with other satellites in the constellation as well as with ground stations. In a preferred embodiment, a telecommunications link between constellation satellites and ground stations is established on one or more UHF and/or SHF radio bands. In another embodiment, the constellation satellites are equipped with software defined radio (SDR) communication systems that allow for telecommunication links to be established through a wide spectrum of radio frequencies and provide the system with the flexibility to adjust according to mission needs.

In a preferred embodiment, data is transferred between constellation satellites and ground stations digitally according to well-known network protocols, such as the File Transfer Protocol (FTP), or a similar system. In other embodiments, the network protocol utilized is secured using a standard such as SSL/TLS, or another similar security standard. Packet delivery of messages/data permits single data streams to be broken into segments and transmitted to multiple receivers/ground stations. The originating single message is then reconstituted on the ground at a central server.

The constellation satellites and ground stations are configured such that intersatellite and satellite to ground station communications compensate for Doppler shift in the transmitted signals due to relative velocities. Doppler compensation techniques are well known in the digital communications arts. In a preferred embodiment, phase-locked loop (PLL) and/or frequency-locked loop demodulation algorithms are applied by the receiver to compensate for Doppler.

The intersatellite communications capability allows for the satellite constellation to form an ad hoc wireless data network with each satellite acting as a node and the network formed in a variety of topologies for the transmission of data according to the needs of the mission and the distribution of the satellites. Each constellation satellite may be programmed and configured to link to other constellation satellites within range and forward data sent by those satellites. The topology and data routing can then be determined dynamically according to the connectivity and operational status of the satellite-nodes.

This flexible data routing provides the invention with the advantage of near real-time communications with the ground based network. For example, because a link between any constellation satellite and the ground requires line of sight, there may be times when an individual satellite is not within communications range of a ground station and cannot transmit its data payload. The constellation satellite must then wait until the next ground station comes within range to send its payload. These individual delays can accumulate to unacceptable levels across the network. The present system allows for the out-of-range constellation satellite to send its data payload to the ground network via any other connected constellation satellite.

The large number of satellites in the constellation and flexible network capabilities provides the system with many advantages over current systems. The malfunction of individual satellite-nodes in a large constellation would have a negligible effect on the overall network throughput. Similarly, the satellite network could route around any non-operational ground station. As discussed above, the dynamic routing capability also allows for near real time transmission of acquired data to the ground network.

The ground station network is configured to transmit data to one or more servers ("ground servers") through the Internet or other suitable data transmission system. For example, a ground station may be connected to the same local area network as a ground server, in which case a more suitable transmission method would be through the local area network.

GPS Signal Structure

Every GPS satellite transmits their navigation signals on two frequencies: 1575.42 MHz ("L1") and 1227.60 MHz ("L2"). The L1 and L2 signals are shared across the GPS satellite network using a code division multiple access (CDMA) technique. The navigation signals transmitted by each satellite in the GPS system are comprised of a carrier wave of constant phase and amplitude, phase modulated with a Navigation Data Modulation (NDM) code. The navigation message is transmitted at a rate of 50 bits per second with each complete message taking 750 seconds (12½ minutes) to complete. The message structure has a basic format of a 1500-bit-long frame made up of five subframes, each subframe being 300 bits (6 seconds) long. Subframes 4 and 5 are subcommutated 25 times each, so that a complete data message requires the transmission of 25 full frames. Each subframe consists of ten words, each 30 bits long. Thus, with 300 bits in a subframe times 5 subframes in a frame times 25 frames in a message, each message is 37,500 bits long. At a transmission rate of 50 bps, this gives 750 seconds to transmit an entire almanac message. Each 30-second frame begins precisely on the minute or half-minute as indicated by the atomic clock on each satellite.

The first subframe of each frame encodes the week number and the time within the week, as well as the data about the health of the satellite. The second and the third subframes contain the ephemeris—the precise orbit for the satellite. The fourth and fifth subframes contain the almanac, which contains coarse orbit and status information for up to 32 satellites in the constellation as well as data related to error correction. Thus, in order to obtain an accurate satellite location from this transmitted message the receiver must demodulate the message from each satellite it includes in its solution for 18 to 30 seconds. In order to collect all the transmitted almanacs the receiver must demodulate the message for 732 to 750 seconds or 12½ minutes.

The ephemeris is updated every 2 hours and is generally valid for 4 hours, with provisions for updates every 6 hours or longer in non-nominal conditions. The almanac is updated typically every 24 hours. Additionally, data for a few weeks following is uploaded in case of transmission updates that delay data upload.

Radio Occultation Determination

Each constellation satellite in the constellation is configured to receive and track occulted and unocculted GPS signals. The location of each constellation satellite is determined from unocculted GPS signals using well-known GPS locating techniques. The location of the GPS satellites is estimated from their known orbits and time and/or decoded from the GPS navigation message within the received GPS signals.

For RO measurement, a constellation satellite tracks a "target" occulted GPS signal on both the L1 and L2 frequencies as it occults through a portion of the atmosphere. The constellation satellite may be configured to track any and all occulted GPS signals it receives or specific occulted GPS signals that pass through a portion of the atmosphere that is over an area of interest (e.g. a developing hurricane system). In a preferred embodiment, open-loop tracking methods are applied by the constellation satellite processor to track the target GPS signal as it occults through the atmosphere.

The RO measurement techniques employed by the constellation satellites are provided in detail in Kuo et al., "Inversion and Error Estimation of GPS Radio Occultation Data," J. Meteorological Soc. of Japan (2004) 82:1B, 507-531; Cucurull, "Global Positioning System (GPS) Radio Occultation (RO) Data Assimilation," presentation, National Oceanic and Atmospheric Administration & Joint Center for Satellite Data Assimilation, DA Colloquium (July 2009); "Radio Occultation," University Corporation for Atmospheric Research (available at: http://www.cosmic.ucar.edu/related_papers/RO_COMET Final.ppt). The contents of these articles are incorporated by reference herein.

In sum, raw measurement of a GPS signal by a constellation satellite receiver is processed to filter out any changes in the raw GPS signal that are not caused by atmospheric Doppler contributions, including geometric delays, clock errors and relativistic effects on the phase. The Doppler shift of the filtered signal with respect to the known properties of the raw GPS signal is then calculated and attributed to atmospheric effects. Using the known velocities of the GPS satellite and the constellation satellite receiver, and assuming spherical symmetry of the Earth and its atmosphere, the bending angle of the GPS signal as it is refracted by the atmosphere is derived. Because the ionosphere has a dispersive effect on radio waves, GPS signals of different frequencies (i.e. L1 and L2) are refracted along slightly different bending angles. The bending angle of both the L1 and L2 signals are calculated separately. The bending angle is inverted through an Abel inversion to produce the index of refraction at the tangent point of the bent signal path. This is computed at the tangent points of both the L1 and L2 signals, which, due to the dispersive effect of the ionosphere, are at different altitudes. Refractivity is a simple conversion from the index of refraction.

EXAMPLE

For a system of 50 satellites, RO signals are tracked across a 150 mile diameter storm off the coast of Florida using US GPS satellite signals; at intervals of 0.5 seconds, RO data is developed by 17 in field of view RO satellites from 7 different GPS sources and an a RO pressure/airspeed velocity map is constructed spanning 13,000 ft of altitude across the diameter of the storm; optical images from 3 RO satellites create a 3D map of the outer cloud surface; the resulting combined digital picture "signature" is compared to a library of past storms and tracks—based on a best fit, the storm track is projected.

As the system tracks additional stations and other weather events, the stored data will grow and longer term trends will become available through proper application of select statistical assessments.

The above process provides data related to a single "snapshot" of the occultation. The process is repeated as the GPS satellite "sets" under or "rises" over the horizon with respect to the receiver constellation satellite, providing a refractivity profile along a vertical column of the atmosphere. This data can be used to derive atmospheric properties depending on the altitude of the measurement. At microwave wavelengths, such as that of the GPS signals, refractivity, N, as a product of atmospheric properties can be expressed as:

$$N = \left[77.6\frac{P}{T}\right] + \left[3.73*10^5\frac{P_w}{T^2}\right] -$$

$$\left[40.3*10^6\frac{n_e}{f^2}+O\left(\frac{1}{f^3}\right)\right]+[1.4*W_w+0.6*W_i]$$

where P is the total pressure (in mb), T is the temperature (in K), $P_w$ is the water vapor pressure (in mb), $n_e$ is the electron density (in $m^{-3}$), $W_w$ is the liquid water content (in $gr/m^3$) and $W_i$ is the ice content (in $gr/m^3$). Different aspects of the equation weigh in more heavily at different parts of the atmosphere. In the lower "wet" portion of the atmosphere (below ~6 km), the P, T and $P_w$ terms dominate. In the "dry" portion of the atmosphere (~6 km to ~70 km), the P and T terms dominate. In the ionosphere (above ~70 km), the ionosphere portion (third bracketed portion of the above equation) dominates. Furthermore, the different frequencies (e.g. L1 and L2) react very differently with the ionosphere allowing to invert the above equation, to determine and then to remove the ionosphere contribution. The scattering terms (last bracketed portion of the above equation) are negligible because the GPS RO measurements are nearly unaffected by clouds.

Figure 5:
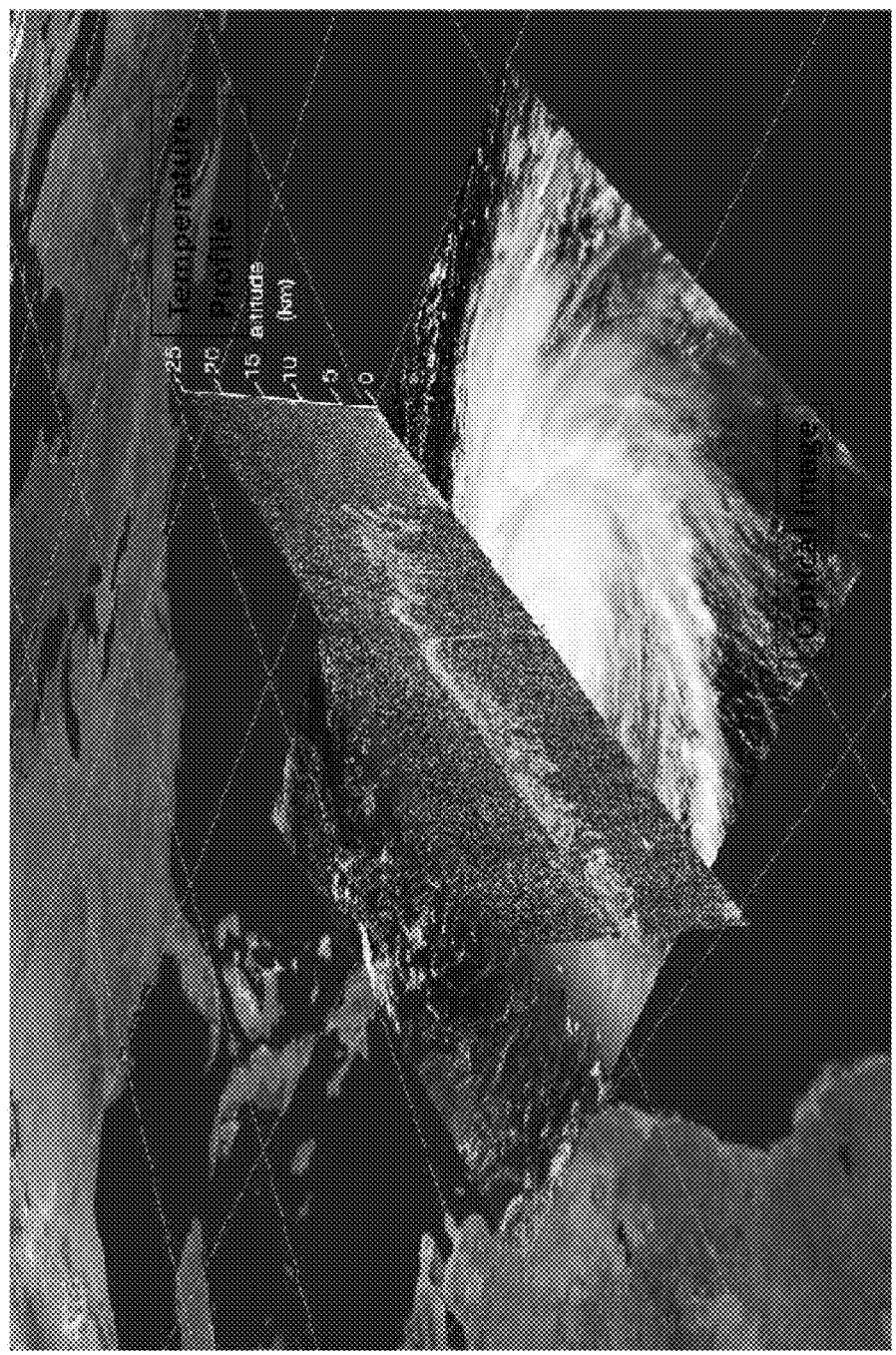
FIG. 5 depicts a temperature profile for a storm system.

FIG. 5 illustrates select atmospheric conditions within a storm system of interest. In a preferred embodiment, each constellation satellite takes RO measurements from any GPS satellite whose occulted signal path passes within the constellation satellite's range of detection, and completes its processing tasks to determine the atmospheric properties of a portion of the atmosphere. The satellite transmits a data package to the ground station network through the satellite data network described above, or directly to a ground station. The data package consists of at least the atmospheric properties and geolocation data, but can also include additional information, such as the receiver satellite identification, receiver satellite status (geolocation data, health, sensor calibration data, orientation, and velocity), time and date of the RO measurement or any portion of the measured GPS signal.

In another embodiment, RO measurement, processing, and data transmission tasks are shared between more than one constellation satellites. This configuration may be useful when satellites are partially malfunctioning, or to share processing capabilities across low power satellites. It also allows for tasks to be assigned to satellites more efficiently. For example, one satellite may be in a location where many RO measurements can be taken, but another satellite is in a poor location for taking RO measurements. In this situation, the first satellite's processing power can be devoted to taking RO measurements, while the second satellite's processor can be tasked with calculating atmospheric parameters.

In yet another embodiment, processing tasks are shared between the satellite constellation and the ground servers. In this configuration, the constellation satellite sends a minimized data package comprising of at least the RO measurements and the servers calculate the atmospheric properties. The remaining parameters may be interpolated by the ground servers from previously obtained data. This takes advantage of the processing capabilities of the servers and also preserves the data processing resources of the satellites. It also allows for more advanced algorithms to be applied by the servers that may factor in data from other sources to provide a more accurate weather solution.

The ground servers collect and compile the atmospheric data into a comprehensive data map that is updated on a near real time basis.

Other Features

FIG. 6 depicts a functional block diagram for an illustrative system arrangement. Starting with block 600, the GNSS transmits signals of known properties—collected by the receivers on-board the low earth orbit satellites forming the collection constellation, block 610. The properties of the GNSS are distributed for subsequent uses, block 650 (not shown). The RO date developed by the constellation, block 610 is delivered to the ground network block 620; in addition, programming and orientation instructions are delivered to the constellation by the ground network to permit proper tracking of select atmospheric conditions. Finally, ground operations include both database management and data processing, block 630; with resulting atmospheric conditions and predictions delivered to a display/distribution system block 640.

FIG. 7 depicts an illustrative logic programming arrangement. Starting at block 700, system operation logically begins with RO data collections triggered by either an event, block 710 or by User Command, block 750. An event may be by automated threshold tracking, for example an atmospheric anomaly, such as a hurricane image identified by constellation image/camera operations, a "yes" to test 710 initiating RO data collection. Once activated, a collection algorithm develops RO data for the region of interest. This algorithm can provide instructions to target satellite operation so that GNSS "paths" of interest are populated (by for example, satellite orientation) and select reception by the constellation, block 730, with data collected at block 740 and deposited into the database.

Continuing with FIG. 7, regional studies are also triggered by USER COMMAND, test 750. If selected, the system determines the profile of RO collection with GNSS and constellation combinations to create the properly oriented paths for study, block 770. Once oriented, the data is collected and delivered to the database for subsequent analysis, 780. Because the constellation collects image data for the same atmospheric regions of interest, processing of RO is done with the image data. Illustrative uses for the image data include resolving ambiguities created by the RO data as to individual data and/or ultimate conclusions regarding conditions within the region.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What I claim is:

1. A system for determining atmospheric conditions, comprising:
    a transmission link to a plurality of satellite-based radio transmitters from one or more Global Navigation Satellite Systems (GNSS), wherein the transmitters transmit radio signals and said signals comprise data reflecting occultation of GNSS based radio signals collected from multiple paths by a constellation of satellites placed in low earth orbit;
    a computer linked database storing said data; and
    a computer processor implementing an occultation analysis algorithm to ascertain atmospheric conditions for use in identifying weather conditions associated with said occultation data.

2. The system of claim 1, wherein the constellation includes at least 50 satellites in low earth orbit.

3. The system of claim 2, wherein the constellation communicates with said transmission link via a network of ground stations.

4. The system of claim 3, wherein the ground stations communicate with said computer linked database to provide recently collected occultation data.

5. The system of claim 1, further comprising a display system to deliver details regarding atmospheric conditions to one or more users by network communications.

6. The system of claim 5, wherein the display system further comprises graphical representation of atmospheric trends or conditions.

7. A method for assessing atmospheric conditions comprising:
    collecting radio occultation (RO) data from a plurality of satellites based on a Global Navigation Satellite System (GNSS) signal tracking;
    collecting image data regarding a region of atmosphere of interest;
    storing in computer memory RO and image data; and
    processing RO and image data to ascertain properties about select regions of atmosphere.

8. The method of claim 7, wherein said plurality of satellites includes at least 50 satellites placed in low earth orbit.

9. The method of claim 7 wherein said image data is generated by one or more of said plurality of satellites.

10. The method of claim 7 wherein said RO data is developed from GNSS signals using multiple paths through a common region of atmosphere.

11. The method of claim 7 wherein said RO data is collected using a plurality of low priced, low life expectancy satellites equipped with receivers for multiple GNSS signals.

12. The method of claim 11 wherein the collection satellites form a constellation linked to internet communications by plural ground stations.

13. A database and associated processor platform in communication with a plurality of low earth orbit satellites, said platform comprises:
    a. A communication link to said satellites assessing and recalling satellite data on atmospheric occultated signals;
    b. A database storing said data with time, Global Navigation Satellite System (GNSS) and location information regarding each occultated signal;
    c. A computer processor programmed with one or more occultation analysis algorithms in communication with said database for implementing said algorithm and rendering projections based on atmospheric conditions determined by said algorithm; and
    d. System output link to deliver projections to one or more network affiliates platform.

14. The platform of claim 13 further comprising an inter-satellite communication link to pass data without instructions between orbiting satellites.

15. The platform of claim 13, wherein the computer processor is configured to analyze image data generated by satellite based cameras in conjunction with said occultation signals.

16. The platform of claim 13 when said image data is generated by USER communication.

* * * * *